(12) United States Patent
Nammi et al.

(10) Patent No.: US 11,398,854 B2
(45) Date of Patent: Jul. 26, 2022

(54) LOW COMPLEXITY HIGH PERFORMANCE SINGLE CODEWORD MIMO FOR 5G WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/167,827

(22) Filed: Feb. 4, 2021

(65) Prior Publication Data

US 2021/0159954 A1 May 27, 2021

Related U.S. Application Data

(63) Continuation of application No. 16/584,011, filed on Sep. 26, 2019, now Pat. No. 10,951,280, which is a
(Continued)

(51) Int. Cl.
*H04B 7/0456* (2017.01)
*H04B 7/0417* (2017.01)
*H04B 7/0413* (2017.01)

(52) U.S. Cl.
CPC ......... *H04B 7/0478* (2013.01); *H04B 7/0413* (2013.01); *H04B 7/0417* (2013.01)

(58) Field of Classification Search
CPC .................... H04B 7/0413; H04B 7/0417
See application file for complete search history.

(56) References Cited

U.S. PATENT DOCUMENTS 7,881,247 B2  2/2011  Pan et al.
7,916,621 B2  3/2011  Khan et al.
(Continued)

FOREIGN PATENT DOCUMENTS

CN   102804623 A   11/2012
CN   102984102 A    3/2013
(Continued)

OTHER PUBLICATIONS

Second office action received for Chinese application No. 201880028348.8 dated Aug. 11, 2021, 28 pages.
(Continued)

*Primary Examiner* — Jaison Joseph
(74) *Attorney, Agent, or Firm* — Amin, Turocy & Watson, LLP

(57) ABSTRACT

A low complexity multiple input multiple output transmitter that transmits a single codeword per channel is disclosed herein. Instead of sending multiple codewords per channel for transmissions that support higher data layer transmissions, the transmitter can send single codewords over multiple channels in order to improve spectral efficiency over a range of signal to interference plus noise ratios. For instance, if a downlink transmission to a user equipment (UE) has a rank of 4, capable of supporting 4 data layers, instead of sending 2 or more codewords over a single downlink control channel, the transmitter can schedule multiple control channels and transmit a single codeword per channel. The transmitter can also include in the signaling to the UE that the multi-codewords are included in multiple downlink control channels.

20 Claims, 10 Drawing Sheets

Related U.S. Application Data continuation of application No. 16/166,473, filed on Oct. 22, 2018, now Pat. No. 10,469,144, which is a continuation of application No. 15/469,200, filed on Mar. 24, 2017, now Pat. No. 10,171,144.

(56) References Cited

U.S. PATENT DOCUMENTS

| | | | |
|---|---|---|---|
| 7,944,985 B2 | 5/2011 | ElGamal et al. | |
| 8,259,643 B2* | 9/2012 | Nam | H04L 1/0029 370/319 |
| 8,737,369 B2* | 5/2014 | Yeon | H04L 1/1671 370/338 |
| 8,750,150 B2 | 6/2014 | Zhang et al. | |
| 8,774,152 B2 | 7/2014 | Han et al. | |
| 9,112,552 B2 | 8/2015 | Ko et al. | |
| 9,385,792 B2* | 7/2016 | Seo | H04B 7/0417 |
| 2010/0157826 A1* | 6/2010 | Yu | H04W 76/14 370/252 |
| 2011/0170625 A1 | 7/2011 | Blankenship et al. | |
| 2012/0008556 A1 | 1/2012 | Noh et al. | |
| 2012/0176981 A1* | 7/2012 | Baldemair | H04L 25/0226 370/329 |
| 2012/0275400 A1* | 11/2012 | Chen | H04J 11/0033 370/329 |
| 2013/0159817 A1 | 6/2013 | Carlach et al. | |
| 2013/0195065 A1* | 8/2013 | Park | H04L 5/0055 370/329 |
| 2013/0322352 A1 | 12/2013 | Han et al. | |
| 2014/0044206 A1* | 2/2014 | Nammi | H04L 1/1893 375/267 |
| 2014/0064392 A1* | 3/2014 | Jonsson | H04L 1/1671 375/267 |
| 2014/0146775 A1* | 5/2014 | Guan | H04L 5/0053 370/329 |
| 2014/0245095 A1* | 8/2014 | Nammi | H04L 1/08 714/749 |
| 2016/0006553 A1 | 1/2016 | Kim et al. | |
| 2016/0128028 A1* | 5/2016 | Mallik | H04L 5/0053 370/336 |
| 2016/0359647 A1* | 12/2016 | Chen | H04B 7/0632 |
| 2017/0201299 A1* | 7/2017 | Nammi | H04L 67/22 |
| 2017/0214502 A1* | 7/2017 | Kim | H04L 1/0009 |
| 2018/0310333 A1* | 10/2018 | Akkarakaran | H04W 72/042 |
| 2019/0280807 A1* | 9/2019 | Shen | H04L 5/0053 |
| 2019/0364568 A1* | 11/2019 | Zhang | H04L 1/1896 |
| 2020/0028609 A1* | 1/2020 | Ahn | H04L 5/0051 |
| 2020/0036424 A1* | 1/2020 | Kang | H04B 7/06 |
| 2020/0036430 A1* | 1/2020 | Kim | H04W 74/0833 |
| 2020/0382191 A1* | 12/2020 | Seo | H04B 17/24 |

FOREIGN PATENT DOCUMENTS

| | | |
|---|---|---|
| JP | 2011-521502 A | 7/2011 |
| JP | 2013-509053 A | 3/2013 |
| JP | 2013-535857 A1 | 3/2015 |
| JP | 2015-516125 A | 6/2015 |
| WO | 2009/123522 A1 | 10/2009 |
| WO | 2011/097828 A1 | 8/2011 |

OTHER PUBLICATIONS

Qualcomm Incorporated, "Codeword to Layer Mapping" [online], 3GPP TSG RAN WG1Meeting #87 R1 1612738, Nov. 14-18, 2016, 3 pages.

First office action received for Chinese application No. 201880028348.8 dated May 18, 2021, 23 pages.(Including English Translation).

Communication pursuant to Article 94(3) EPC received for European application No. 18715290.5 dated Mar. 17, 2021, 4 pages.

Notice of Reasons for Refusal received for Japanese application No. 2019-552610 dated Jan. 28, 2021, 8 pages.

Qualcomm Incorporated, "CW to Layer Mapping" [online], 3GPP TSG RAN WG1Meeting #88 R1 1702596, 2017, Feb. 7, 2016, 7 pages.

International Search Report Written Opinion received for PCT Application No. PCT/US2018/020570, dated Jun. 27, 2018, 15 pages.

Huawei, et al. "Layer mapping for 4 branch MIMO." 3GPP TSG-RAN WG1 Meeting #67, Nov. 2011. 7 pages.

Panasonic. "Discussion on maximum number of codewords for 4x4 MIMO." 3GPP TSG-RAN WG1 Meeting #46bis. Oct. 2006. 4 pages.

Non-Final Office Action received for U.S. Appl. No. 15/469,200 dated Jan. 9, 2018, 20 pages.

Non-Final Office Action received for U.S. Appl. No. 16/166,473 dated Apr. 4, 2019, 20 pages.

Non-Final Office Action received for U.S. Appl. No. 16/584,011 dated Jun. 1, 2020, 25 pages.

Notification to Grant Patent Right for Invention received for Chinese application No. 201880028348.8 dated Feb. 7, 2022, 3 pages(Including English Translation).

* cited by examiner

LOW COMPLEXITY HIGH PERFORMANCE SINGLE CODEWORD MIMO FOR 5G WIRELESS COMMUNICATION SYSTEMS

RELATED APPLICATION

This application is a continuation of, and claims priority to each of, U.S. patent application Ser. No. 16/584,011 (now U.S. Pat. No. 10,951,280), filed Sep. 26, 2019, and entitled "A LOW COMPLEXITY HIGH PERFORMANCE SINGLE CODEWORD MIMO FOR 5G WIRELESS COMMUNICATION SYSTEMS," which is a continuation of U.S. patent application Ser. No. 16/166,473 (now U.S. Pat. No. 10,469,144), filed Oct. 22, 2018, and entitled "A LOW COMPLEXITY HIGH PERFORMANCE SINGLE CODEWORD MIMO FOR 5G WIRELESS COMMUNICATION SYSTEMS," which is a continuation of U.S. patent application Ser. No. 15/469,200 (now U.S. Pat. No. 10,171,144), filed Mar. 24, 2017, and entitled "A LOW COMPLEXITY HIGH PERFORMANCE SINGLE CODEWORD MIMO FOR 5G WIRELESS COMMUNICATION SYSTEMS." The entireties of the above applications are expressly incorporated in their entirety herein by reference.

TECHNICAL FIELD

The present application relates generally to the field of mobile communication and, more specifically, to a low complexity, high performance, single codeword MIMO transmitter in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
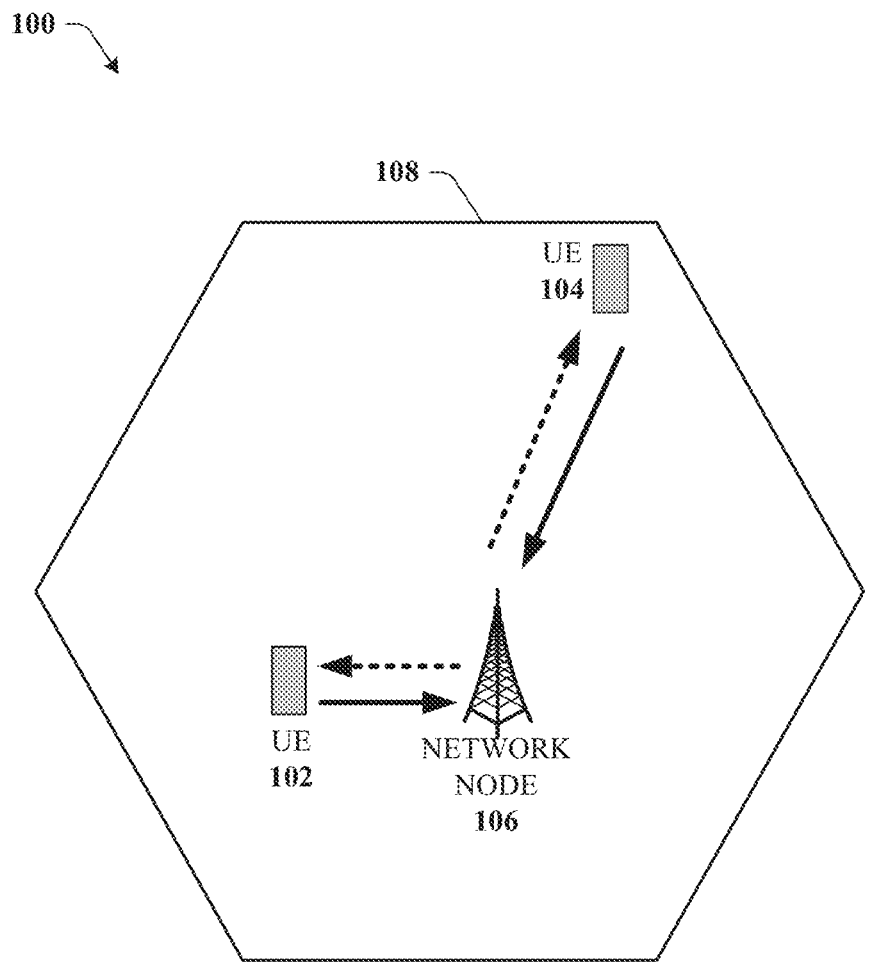
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a transmitter device can comprise a processor and a memory that stores executable instructions that, when executed by the processor facilitate performance of operations. The operations can comprise determining a rank associated with a first transmission via a control channel to a receiver device. The operations can also comprise determining a first number of codewords to be used to transmit control channel information for the first transmission based on the rank. The operations can also comprise scheduling a second number of control channel grants to transmit the first number of codewords, wherein respective codewords of the first number of codewords are scheduled separately on respective control channel grants of the second number of control channel grants.

In another embodiment, method comprises determining, by a transmitter device comprising a processor, a first number of data layers for a transmission generated according to a multiple input multiple output protocol to a receiver device. The method can also comprise determining, by the transmitter device, a second number of codewords to be used to transmit control channel information to the receiver device based on the first number of data layers. The method can also comprise establishing, by the transmitter device, a third number of control channels via which to transmit the second number of codewords, wherein respective codewords of the second number of codewords are scheduled separately on respective control channels to the receiver device.

In another embodiment machine-readable storage medium, comprising executable instructions that, when executed by a processor of a device, facilitate performance of operations. The operations can comprise determining a rank associated with a control channel transmission to a receiver device based on channel state information received from the receiver device. The operations can also comprise determining a first number of codewords to be used to transmit control channel information for the control channel transmission based on the rank. The operations can also comprise establishing a second number of control channels to transmit the first number of codewords, wherein each codeword of the first number of codewords is scheduled separately on a respective control channel.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for a low complexity multiple input multiple output transmitter that transmits a single codeword per channel Instead of sending multiple codewords per channel for transmissions that support higher data layer transmissions, the transmitter can send single codewords over multiple channels in order to improve spectral efficiency over a range of signal to interference plus noise ratios. For instance, if a downlink transmission to a user equipment (UE) has a rank of 4, capable of supporting 4 data layers, instead of sending 2 or more codewords over a single downlink control channel, the transmitter can schedule multiple control channels and transmit a single codeword per channel. The transmitter can also include in the signaling to the UE that the multi-codewords are included in multiple downlink control channels.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Figure 2:
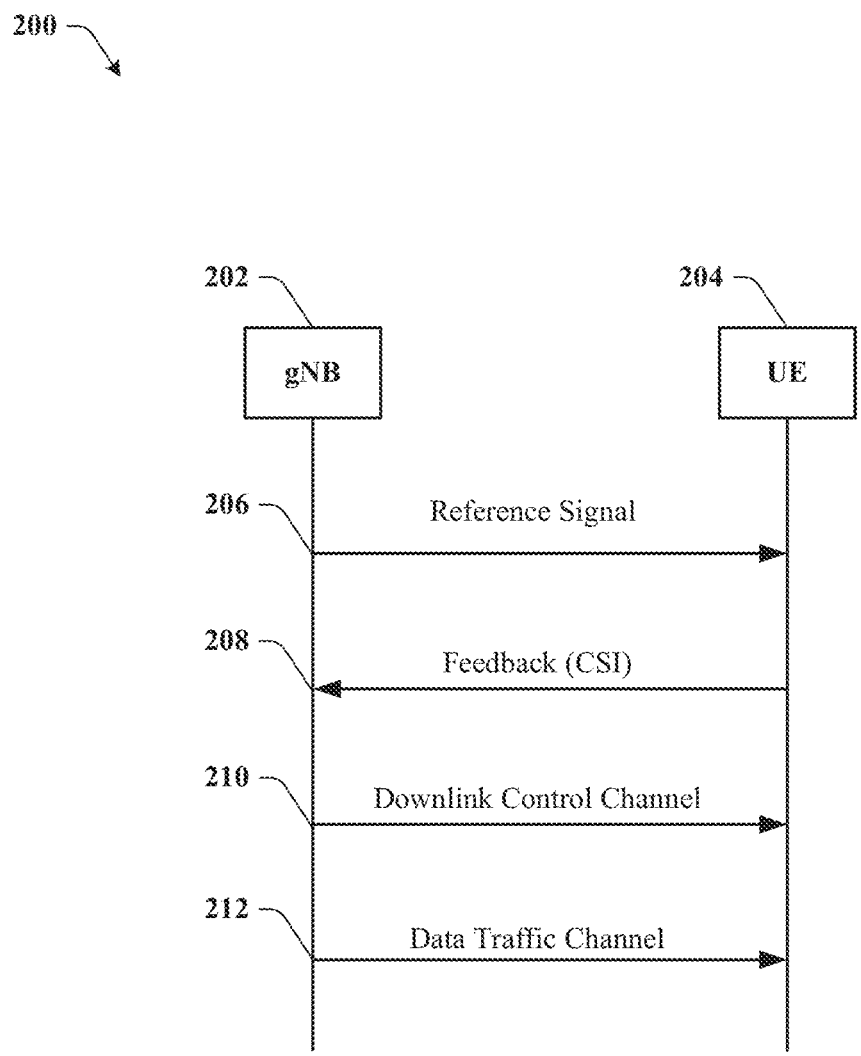
FIG. 2 illustrates an example block diagram of a message sequence chart in accordance with various aspects and embodiments of the subject disclosure.

Turning now to FIG. 2, illustrated is an example block diagram of a message sequence chart 200 in accordance with various aspects and embodiments of the subject disclosure.

The message sequence chart 200 can be between a gNodeB 202 and a UE 204 within the gNodeB 202 cell. The gNodeB 202 can send a reference signal 206 (CSI-RS) to the UE 204. The reference signal 206 can be a pilot signal that is cellular specific or UE specific and is used by the UE 204 to acquire channel-state information (CSI) and beam specific information (beam RSRP). In 5G wireless networks, the CSI-RS is UE specific so it can have a significantly lower time/frequency density. The reference signal 206 can also include demodulation reference signals that are intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

The UE 204 can send back a feedback signal 208 that comprises channel state information determined from the reference signal(s) 206. The channel state information can include a channel quality indicator, precoding matrix, rank information, and resource indicator (beam indicator). The rank indicator indicate the number of layers that are supportable in transmissions between the gNodeB 202 and the UE 204. For instance, when the SINR is low, due to a function of low power, a large distance between the devices, path loss, and/or other interference, the rank indicator can be 1, indicating that only one layer can be supported. In other embodiments, when the SINR is high, the Rank can be two or four or higher, indicating that multiple data layers can be supported, allowing MIMO communications between the gNodeB 202 and the UE 204.

In an embodiment, the downlink control channel 210 (Physical Downlink Control Channel—"PDCCH") comprises information about scheduling grants, which comprises number of MIMO layers scheduled, transport block sizes, modulation for each codeword, parameters related to HARQ, sub band locations and also PMI corresponding to that sub bands. Note that, all downlink control information (DCI) formats may not use transmit all the information as shown above. In general the contents of PDCCH depends on transmission mode and DCI format.

For traditional multi-codeword MIMO communications, the feedback channel (both downlink and uplink) overhead is proportional to the transmission rank. For example if the UE reported rank is equal to four, then the receiver reports four channel quality indicators, similarly the transmitter needs to transmit information relating to four transport block sizes, modulation formats, HARQ process numbers, redundancy versions and etc. Hence the feedback channel overhead is proportional to the transmission rank. For reducing the overhead, the codeword dimensioning principle was proposed in LTE to bundle the layers and supports up to two layers per codeword. Where the codeword is defined as an information block appended with a CRC. Each codeword is separately coded using turbo coding and the coded bits from each codeword are scrambled separately. The complex-valued modulation symbols for each of the codewords to be transmitted are mapped onto one or multiple layers. The complex-valued modulation symbols $d^{(q)}(0), \ldots, d^{(q)}(M^{(q)}_{symb}-1)$ for code word q are mapped onto the layers $x(i)=[x^{(0)}(i) \ldots x^{(v-1)}(i)]^T$, $i=0, 1, \ldots, M^{layer}_{symb}-1$, where v is the number of layers and $M^{layer}_{symb}$ is the number of modulation symbols per layer. In LTE, whenever the transmission rank is more than two, the transport block size is increases to accommodate higher numbers of bits.

The overhead due to downlink and uplink feedback signaling is reduced when MIMO codeword dimensioning is applied. However the drawback with codeword dimensioning is that the link throughput is impacted as the MIMO layers with different channel qualities are coupled as one codeword. To solve this problem, the present disclosure discloses using For rank one communications, the gNodeB 202 can transmit one codeword that comprises the DCI on one layer. For rank two communications the gNodeB 202 can send either one codeword representing two layers, or can send two codewords on separate downlink control channels so that each downlink control channel comprises one codeword each. Similarly, for rank four conditions, the gNodeB 202 can send either four codewords separately on four different DCI channels, or can use codeword expansion to schedule two downlink control channels where each downlink control channel comprises a single codeword representing two layers. The downlink control information can comprise information relating to scheduling and establishing the data traffic channel including the number of MIMO layers scheduled, transport block sizes, modulation for each codeword, parameters related to HARQ, sub band locations and also PMI corresponding to the sub bands.

Figure 3:
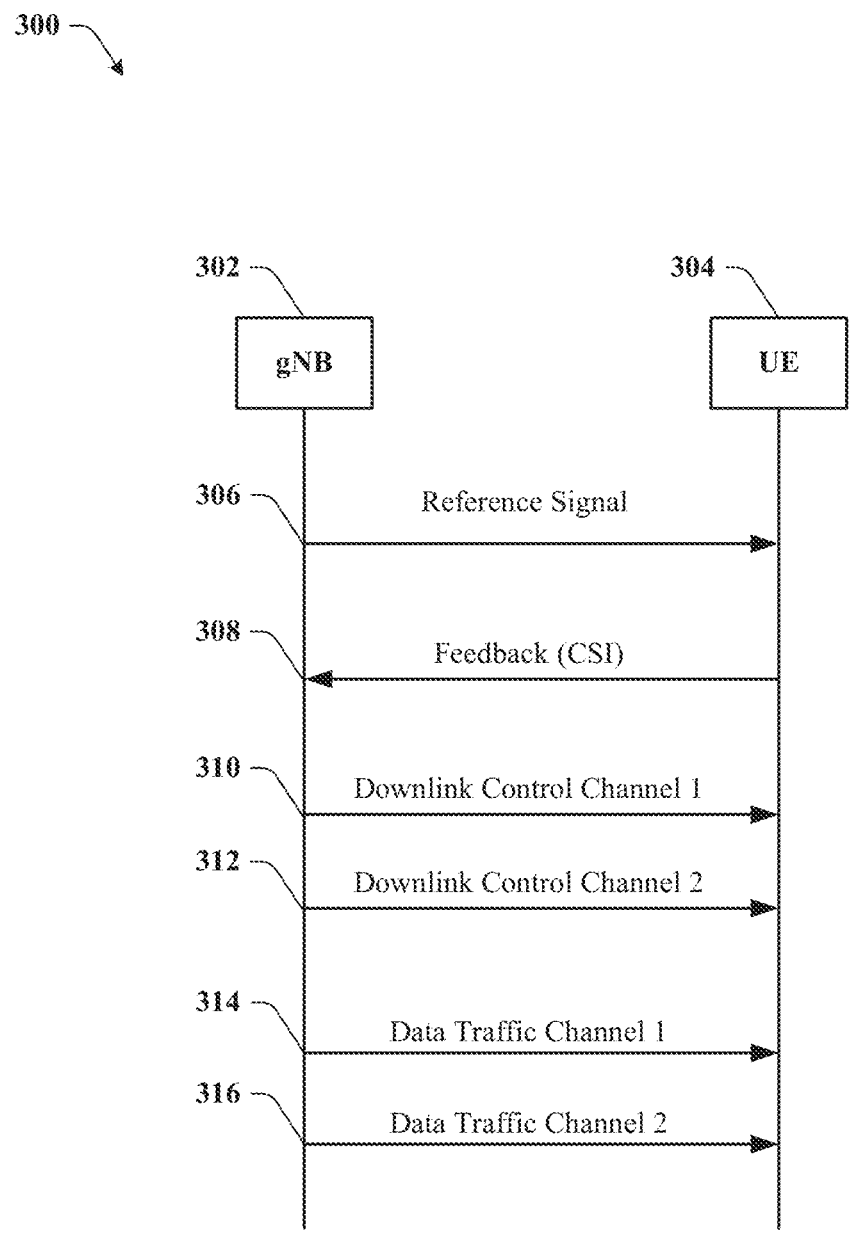
FIG. 3 illustrates an example block diagram of another message sequence chart in accordance with various aspects and embodiments of the subject disclosure.

Turning now to FIG. 3, illustrated is an example block diagram of another message sequence chart 300 in accordance with various aspects and embodiments of the subject disclosure. In FIG. 3, the gNodeB 302 sends the reference signal 306 to the UE 304, and the UE 304 sends back on the feedback channel 308 information indicating that the rank is at least two, meaning that two layers can be supported.

The gNodeB 302 can then encode codewords corresponding to the at least layers on separate downlink control channels 1 (310) and 2 (312), which contain scheduling information and other parameters used to establish corresponding data traffic channels 1 (314) and 2 (316) respectively. In an embodiment, if the rank is two, the downlink control channels comprise a codeword representing one layer each. If the rank is higher, such as four, the codewords in downlink control channels 1 (310) and 2 (312) can represent two layers each via codeword expansion. In other embodiments, the gNodeB 302 can establish four or more downlink control channels each comprising a single codeword.

The main principle behind the proposed system is that rather than using single scheduling grant/downlink control channel for supporting multiple codeword MIMO, the network uses multiple scheduling grants/downlink control channels where each downlink control structure is same as that of single codeword there by providing gains due to multiple codeword MIMO. For example as shown in FIG. 3, the multiple codeword MIMO with multiple scheduling grants (we show only two scheduling grants and 2 data traffic channels, however, the same concept can be extended to multiple scheduling grants and multiple data traffic channels).

The gNodeB 302 can determine the number of scheduling grants/number of data traffic channels based on the rank received in the channel state information in the feedback channel 308 (for rank one and two, there can be a single control channel with a single codeword, while for ranks three and four, the gNodeB 302 can use two control channels with two codewords). In another embodiment, the network can determine the number of control channels based on long term SINR or path loss of the UE or the location of the UE. For instance, if the UE is near the cell edge or has higher path loss, then only one control channel will be used, while if the UE is near the center of the cell or has low path loss then multiple control channels can be used.

Once the gNodeB 302 determines the number of multiple control channels, then each control channel schedules only one codeword per channel, i.e. single codeword MIMO control channel is used. For example say, if the network wants to schedule a rank four MIMO with four codewords, then the network sends four downlink control channels and 4 data traffic channels, where each data traffic channel is a of rank=1. The same concept can be extended with codeword expansion. i.e. a rank four MIMO can be scheduled with two downlink control channels and two data traffic channels, where each data traffic channel is of rank two with single codeword. The same concept can be extended for multiple configurations.

The gNodeB 302 can also signal to the UE 304 in the downlink control channel 1 or 2, on which antenna ports the data traffic channel(s) is/are mapped. The scheduling grants in the control channel can then indicate on which antenna ports the scheduling grants are valid. Once the UE 304 receives multiple downlink control channels and multiple data traffic channels, the UE 304 decodes the data traffic channels jointly for achieving the full benefits of multi codeword MIMO.

Figure 4:
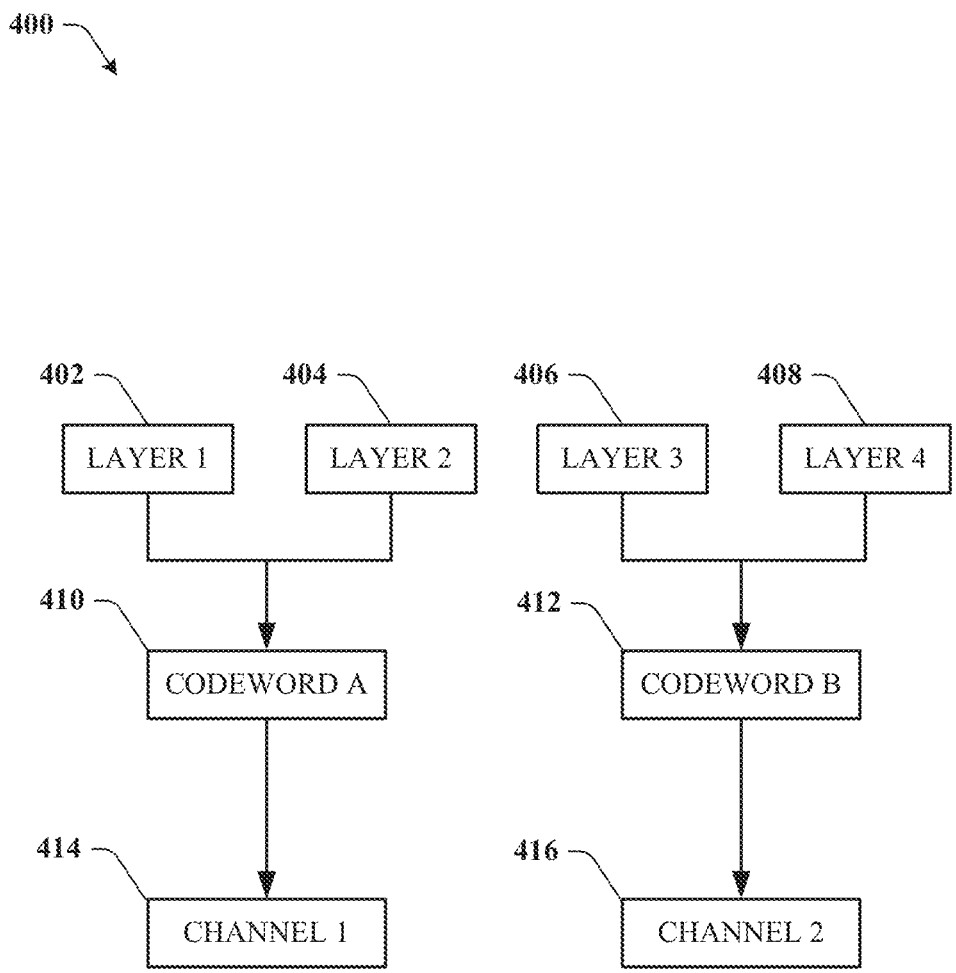
FIG. 4 illustrates an example block diagram of a MIMO system in accordance with various aspects and embodiments of the subject disclosure.
Figure 5:
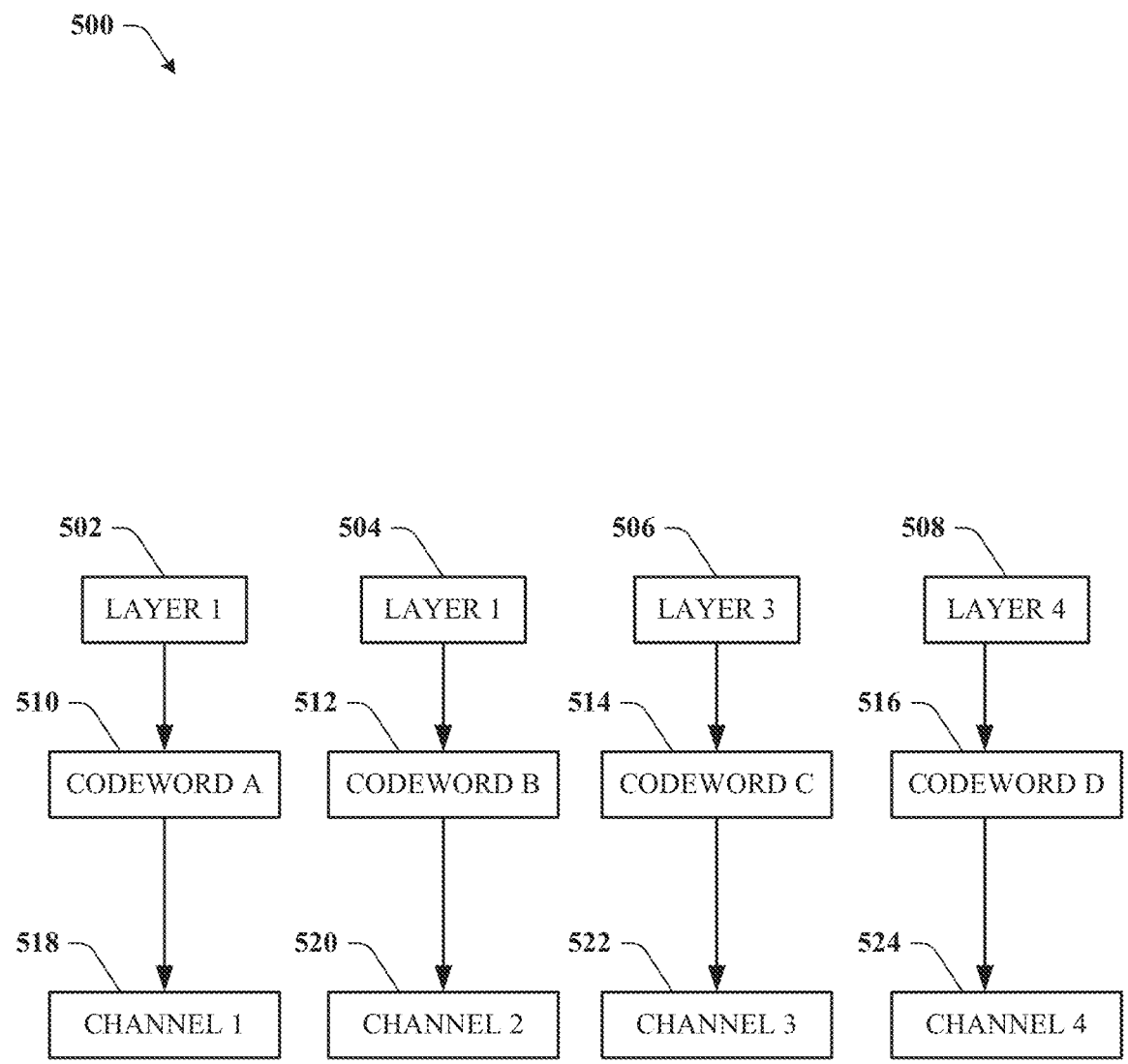
FIG. 5 illustrates an example block diagram of another MIMO system in accordance with various aspects and embodiments of the subject disclosure.

Referring now to FIG. 4 and FIG. 5, illustrated are example block diagrams 400 and 500 of a MIMO system in accordance with various aspects and embodiments of the subject disclosure showing how the network node can perform codeword expansioning to handle communications that have a rank of four.

In FIG. 4, there can be four layers, Layers 1-4 (402, 404, 406, and 408). Layer 1 402 and Layer 2 404 can each be represented by a single codeword A 410 that is transmitted via a first downlink control channel 414. Similarly, Layers 3 and 4 (406 and 408) can be represented by codeword B 412 and transmitted to the UE via second downlink control channel 416.

By contrast, instead of using codeword expansion as in FIG. 4, in FIG. 5 each of the layers 502, 504, 506, and 508 are represented by separate codewords 510, 512, 514, and 516 and transmitted via respective downlink control channels 518, 520, 522, and 524.

In some embodiments, the network node can determine whether to use codeword expansion or not based on local conditions such as SINR, path loss, UE location, or other local contexts, or based on various standards established by the mobile network.

It is also to be appreciated that while the embodiments described herein have been described in relation to downlink control channels, i.e., from the base station device to the mobile device, the same principles can also be applied to uplink and side link systems. Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

Figure 6:
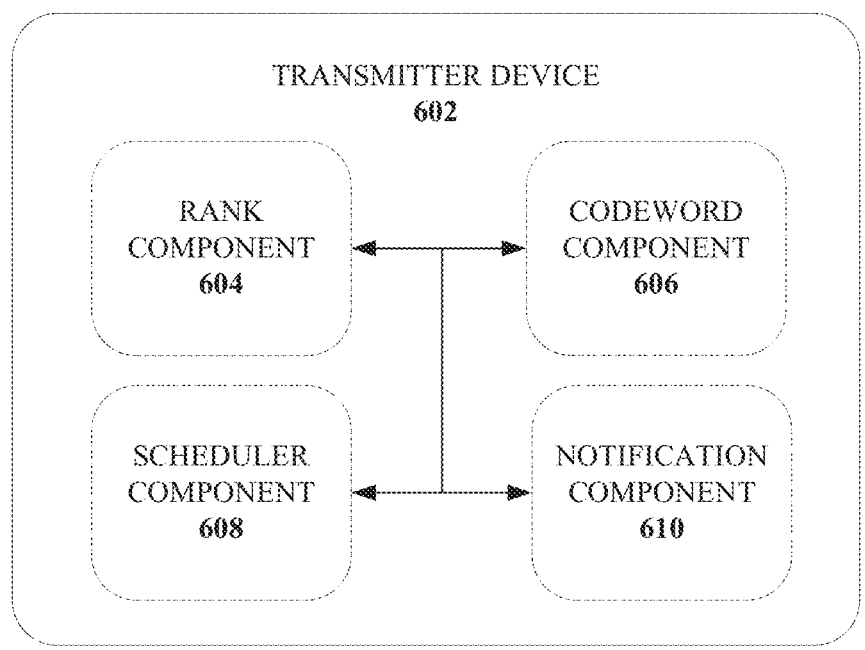
FIG. 6 illustrates an example block diagram of a transmitter system in accordance with various aspects and embodiments of the subject disclosure.

Turning now to FIG. 6, illustrated is a transmitter device according to various embodiments disclosed herein.

The transmitter device 602 can include a rank component 604 that determines a rank associated with a control channel transmission to a receiver device. The rank component 604 can determine the rank based on channel state information received from the receiver device, or based on a historic signal to interference plus noise ratio for a transmission to the receiver device or based on path loss to the receiver or the location of the receiver. The rank can indicate the number of data layers that are useable by the transmitter device 602.

The transmitter device 602 can also comprise a codeword component 606 that determine a first number of codewords to be used to transmit control channel information for the control channel transmission based on the rank. The codeword component 606 can determine whether to use codeword expansioning in order to match the number of codewords to the layers, or to use 2 layers per codeword.

The transmitter device can further comprise a scheduler component 608 that schedules a second number of control channel grants to transmit the first number of codewords, wherein each codeword is scheduled separately on a respective control channel grant. The notification component 610 can also include in the control channel information information associated with an antenna port for a subsequent data traffic channel to let the receiver device know where and how to receive the data traffic signals.

Figure 7:
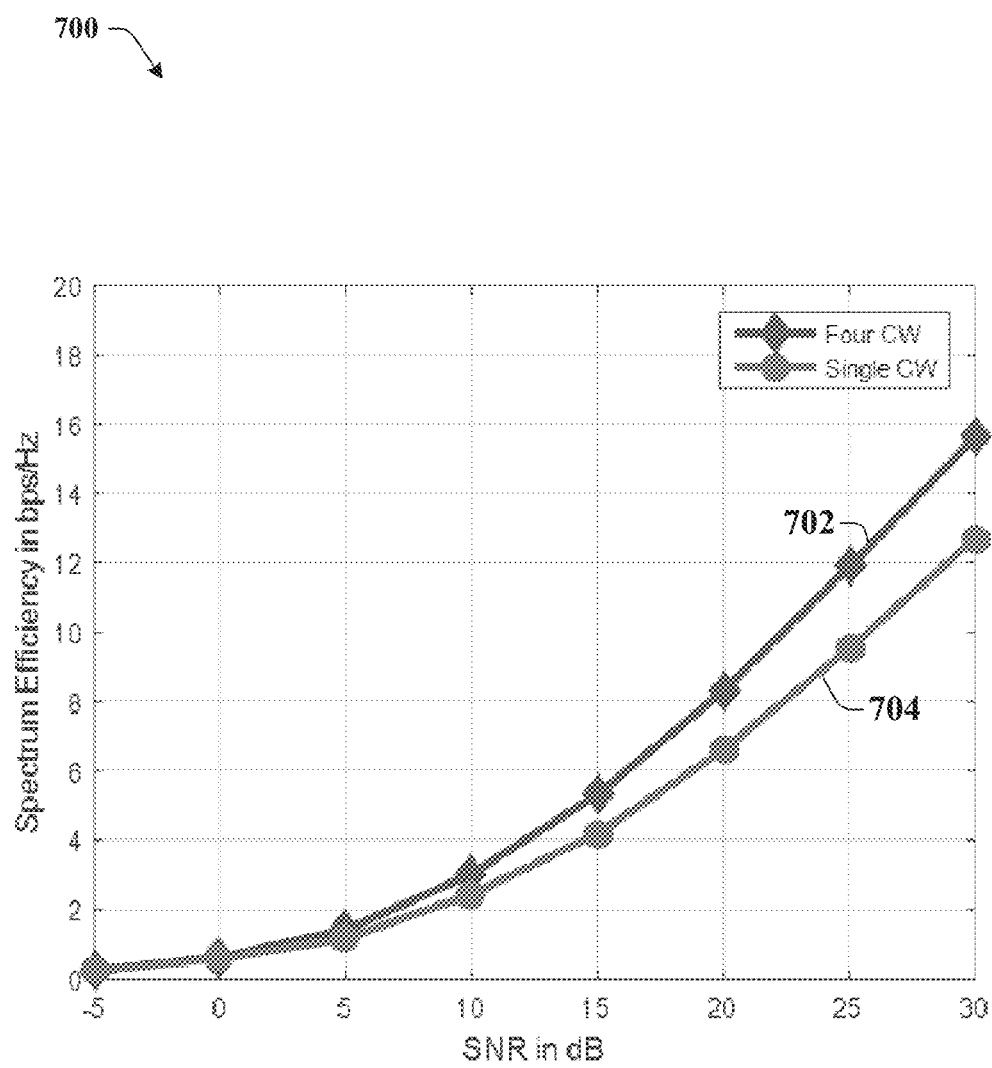
FIG. 7 illustrates an example graph showing spectral efficiency for single codeword and multiple codewords in accordance with various aspects and embodiments of the subject disclosure.

Turning now to FIG. 7, illustrated is an example graph 700 showing spectral efficiency for single codeword and multiple codewords in accordance with various aspects and embodiments of the subject disclosure.

As an example, graph 700 shows the spectral efficiency as a function of SNR for a 4×4 MIMO systems with single codeword 704 vs four codeword transmission 702 on a single data traffic channel. It can be observed that at very low SNRs the performance with single codeword 704 is almost identical to that of four codewords 702. This is because at very low SNR (0 dB or −5 dB) there is a high probability that rank is either 1. However, for medium to high SNRs, the performance with single codeword 704 is inferior to four codewords 702. For example at medium SNR of 10 dB, 19% loss in the spectral efficiency compared to four codeword MIMO. Similarly, at high SNR of 25 dB, the loss is around 20% compared to the four codeword MIMO. The loss is significant because in a single codeword MIMO, the CQI is controlled by the SINR of the weaker layer. Therefore, by using the single codeword per channel as disclosed herein, the system can obtain the performance of the single code word MIMO 704, even though multiple codewords are being transmitted simultaneously, just on separate channels.

Figure 8:
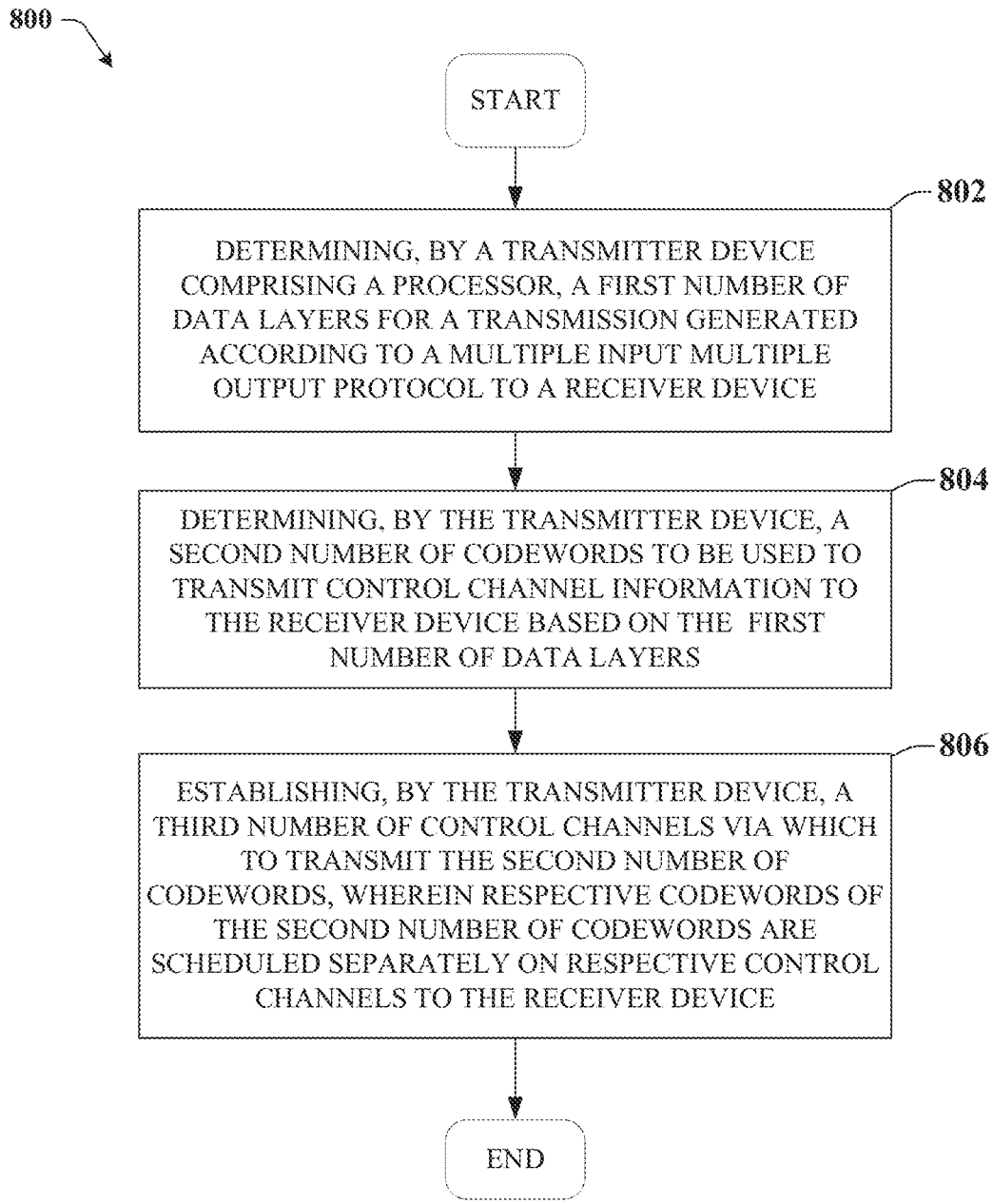
FIG. 8 illustrates an example method for using a single codeword per channel MIMO transmitter in accordance with various aspects and embodiments of the subject disclosure.

FIG. 8 illustrates a process in connection with the aforementioned systems. The process in FIG. 8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates an example method 800 for using a single codeword per channel MIMO transmitter in accordance with various aspects and embodiments of the subject disclosure.

Method 800 can start at 802, where the method comprises determining, by a transmitter device comprising a processor, a first number of data layers for a transmission generated according to a multiple input multiple output protocol to a receiver device.

At 804 the method comprises determining, by the transmitter device, a second number of codewords to be used to transmit control channel information to the receiver device based on the first number of data layers.

At 806, the method comprises establishing, by the transmitter device, a third number of control channels via which to transmit the second number of codewords, wherein respective codewords of the second number of codewords are scheduled separately on respective control channels to the receiver device.

Figure 9:
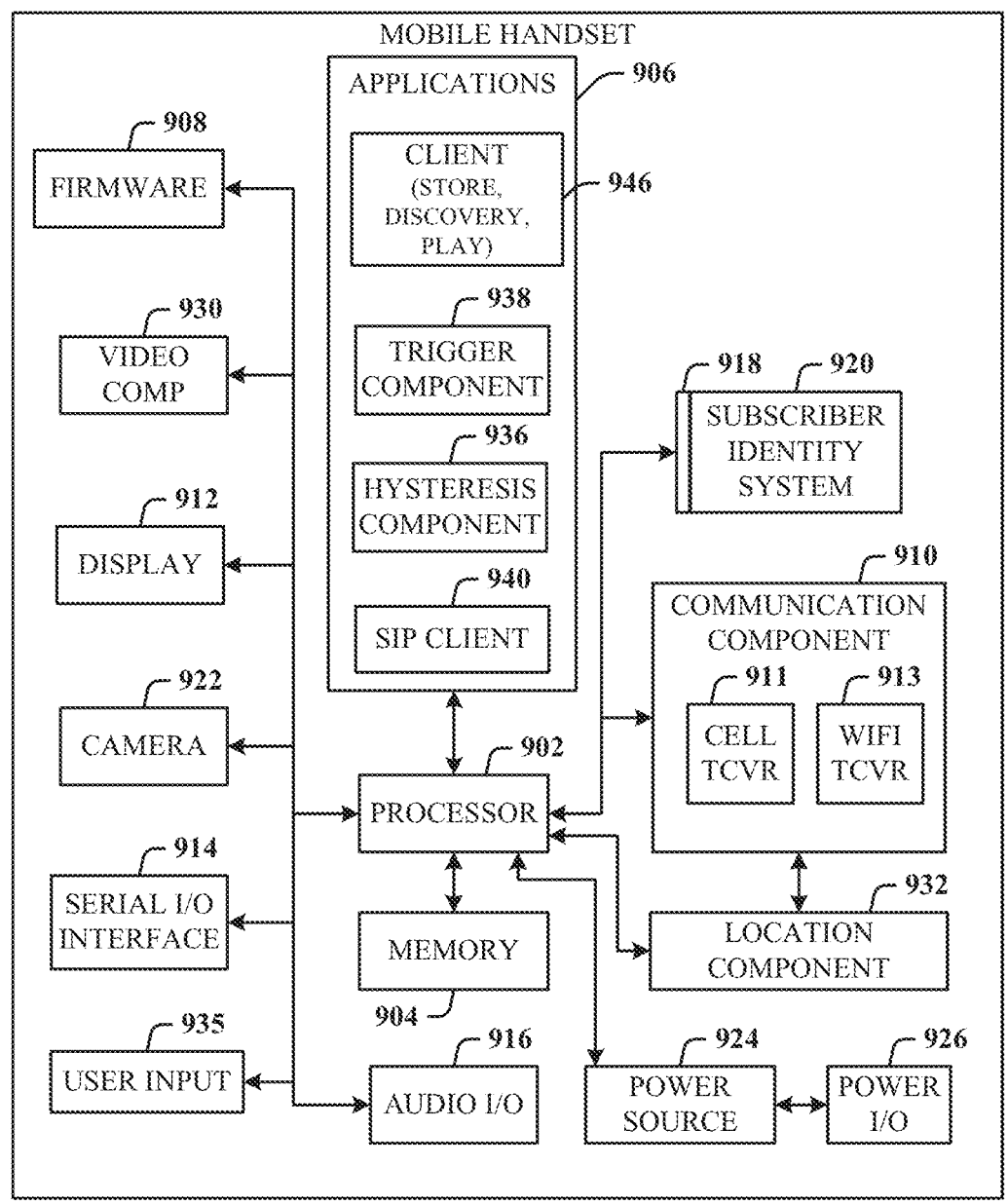
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Referring now to FIG. 13, there is illustrated a block diagram of a computer 1300 operable to execute the functions and operations performed in the described example embodiments. For example, a network node (e.g., network node 406) may contain components as described in FIG. 13. The computer 1300 can provide networking and communication capabilities between a wired or wireless communication network and a server and/or communication device. In order to provide additional context for various aspects thereof, FIG. 13 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 10:
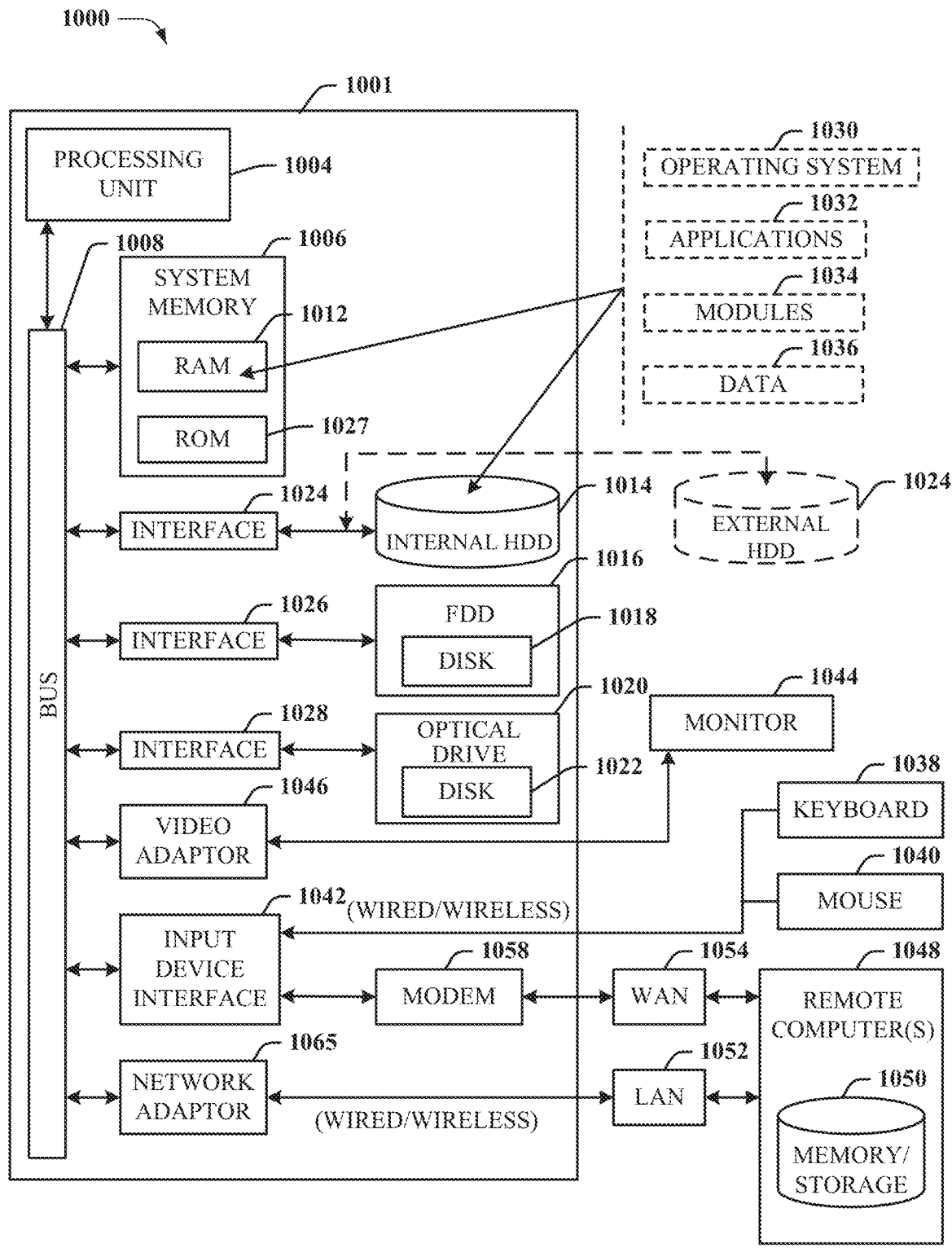
FIG. 10 illustrates an example block diagram of a computer that can be operable to execute processes and methods in accordance with various aspects and embodiments of the subject disclosure.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    determining, by network equipment comprising a processor, a first quantity of data traffic channels for transmission to a user equipment based on a condition associated with the user equipment; and
    scheduling, by the network equipment, respective codewords of a group of codewords to respective control channels of a group of control channels, wherein a second quantity of the respective control channels and the first quantity of data traffic channels is a same quantity, and wherein the determining comprises determining the first quantity of data traffic channels based on a third quantity of scheduling grants for the user equipment.

2. The method of claim 1, further comprising:
    transmitting, by the network equipment, at substantially a same time, the respective codewords via the respective control channels.

3. The method of claim 1, wherein the scheduling comprises scheduling a single codeword of the group of codewords to a single control channel of the group of control channels.

4. The method of claim 1, wherein the condition is a rank assigned to the user equipment, and wherein the method further comprises:
    prior to the determining, receiving, by the network equipment, channel state information comprising rank information indicative of the rank assigned to the user equipment, wherein the channel state information is received, via a feedback channel, in response to a reference signal transmitted to the user equipment.

5. The method of claim 1, wherein the condition is a signal to interference plus noise ratio, and wherein the method further comprises:
    prior to the determining, receiving, by the network equipment, channel state information via a feedback channel, wherein the channel state information comprises information indicative of the signal to interference plus noise ratio reported by the user equipment.

6. The method of claim 1, wherein the condition is a path loss of the user equipment, and wherein the method further comprises:
    prior to the determining, receiving, by the network equipment, channel state information via a feedback channel, wherein the channel state information comprises information indicative of the path loss of the user equipment.

7. The method of claim 6, wherein a value of the path loss satisfies a defined path loss value, wherein the determining comprises determining the first quantity is one, and wherein a single data traffic channel is used for transmission to the user equipment.

8. The method of claim 6, wherein a value of the path loss fails to satisfy a defined path loss value, wherein the determining comprises determining the first quantity is at least two, and wherein at least two data traffic channels are used for transmission to the user equipment.

9. The method of claim 1, wherein the condition is a location of the user equipment, wherein the location is a cell edge, wherein the determining comprises determining the first quantity is one, and wherein a single data traffic channel is used for transmission to the user equipment.

10. The method of claim 1, wherein the condition is a location of the user equipment, wherein the location is a center of a cell, wherein the determining comprises determining the first quantity is at least two, and wherein at least two data traffic channels are used for transmission to the user equipment.

11. A system, comprising:
a processor; and
a memory that stores executable instructions that, when executed by the processor, facilitate performance of operations, comprising:
establishing a first quantity of data traffic channels for transmission of data to a user equipment, wherein the establishing is based on a reported condition associated with the user equipment;
scheduling codewords to control channels, wherein the first quantity of data traffic channels correspond to a second quantity of control channels, and wherein respective codewords of the codewords are scheduled to respective control channels of the control channels; and
transmitting the codewords, via the control channels, at substantially a same time.

12. The system of claim 11, wherein the reported condition is a path loss of the user equipment, and wherein the operations further comprise:
prior to the establishing, receiving channel state information via a feedback channel, wherein the channel state information comprises information indicative of the path loss of the user equipment; and
based on the path loss satisfying a defined path loss value, setting the first quantity to one, wherein a single data traffic channel and a single control channel are used for transmission to the user equipment.

13. The system of claim 11, wherein the reported condition is a path loss of the user equipment, and wherein the operations further comprise:
prior to the establishing, receiving channel state information via a feedback channel, wherein the channel state information comprises information indicative of the path loss of the user equipment; and
based on the path loss failing to satisfy a defined path loss value, setting the first quantity to at least two, wherein at least two data traffic channels and at least two control channels are used for transmission to the user equipment.

14. The system of claim 11, wherein the reported condition is a location of the user equipment, wherein the location is a cell edge, wherein the establishing comprises determining the first quantity is one, and wherein a single data traffic channel is used for transmission to the user equipment.

15. The system of claim 11, wherein the reported condition is a location of the user equipment, wherein the location is a center of a cell, wherein the establishing comprises determining the first quantity is at least two, and wherein at least two data traffic channels are used for transmission to the user equipment.

16. A non-transitory machine-readable medium, comprising executable instructions that, when executed by a processor, facilitate performance of operations, comprising:
receiving, via a feedback channel, control information from a user equipment, wherein the control information comprises information indicative of a condition of the user equipment;
establishing a first quantity of data traffic channels that correspond to a second quantity of scheduling grants for the user equipment; and
scheduling a third quantity of control channels, wherein control channels of the third quantity of control channels comprise respective codewords, and wherein the first quantity, the second quantity, and the third quantity are equal quantities; and
transmitting, concurrently, the respective codewords via the third quantity of control channels.

17. The non-transitory machine-readable medium of claim 16, wherein the condition is a rank assigned to the user equipment, and wherein the receiving comprises receiving, via the feedback channel and in response to a reference signal transmitted to the user equipment, channel state information comprising rank information indicative of the rank assigned to the user equipment.

18. The non-transitory machine-readable medium of claim 16, wherein the condition is a signal to interference plus noise ratio, wherein the receiving comprises receiving channel state information via the feedback channel, and wherein the channel state information comprises information indicative of the signal to interference plus noise ratio reported by the user equipment.

19. The non-transitory machine-readable medium of claim 16, wherein the condition is a location of the user equipment, wherein the location is a cell edge, wherein the establishing comprises determining the first quantity is one, and wherein a single data traffic channel is used for transmission to the user equipment.

20. The non-transitory machine-readable medium of claim 16, wherein the condition is a location of the user equipment, wherein the location is a center of a cell, wherein the establishing comprises determining the first quantity is at least two, and wherein at least two data traffic channels are used for transmission to the user equipment.

* * * * *